April 19, 1932. C. H. MILLER 1,854,212
HOISTING MECHANISM FOR TRUCK BODIES
Filed Aug. 9, 1930 2 Sheets-Sheet 1

INVENTOR.
CHARLES H. MILLER,
BY Samuel Herrick
ATTORNEY.

April 19, 1932. C. H. MILLER 1,854,212
HOISTING MECHANISM FOR TRUCK BODIES
Filed Aug. 9, 1930 2 Sheets-Sheet 2
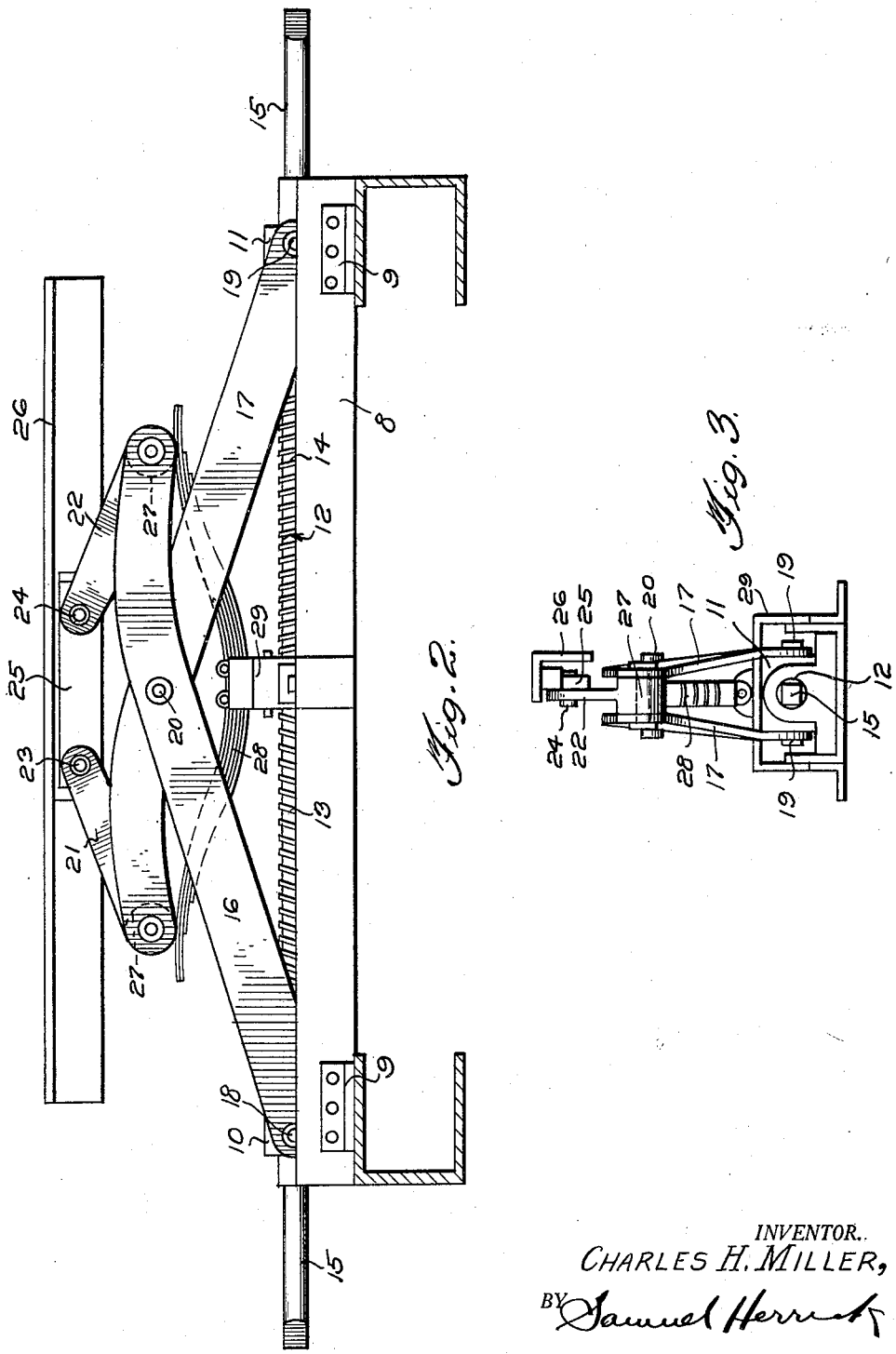
INVENTOR.
CHARLES H. MILLER,
BY Samuel Herrick
ATTORNEY.

Patented Apr. 19, 1932

1,854,212

UNITED STATES PATENT OFFICE

CHARLES H. MILLER, OF CHICAGO, ILLINOIS

HOISTING MECHANISM FOR TRUCK BODIES

Application filed August 9, 1930. Serial No. 474,182.

This invention relates to a hoisting mechanism for truck bodies, and it has for its object to provide a simple and economical mechanism which, while manually operable, is capable of exerting such great power as to easily lift and dump a loaded truck body, without the necessity for undue exertion upon the part of the operator.

Further objects and advantages of the invention will be set forth in the detailed description which follows.

In the accompanying drawings:

Fig. 2 is a view of the operating mechanism, hereinafter described.

Fig. 3 is an end view of the operating mechanism shown in Fig. 2, as viewed from the right thereof.

Like numerals designate corresponding parts on the figures of the drawings.

Figure 1:
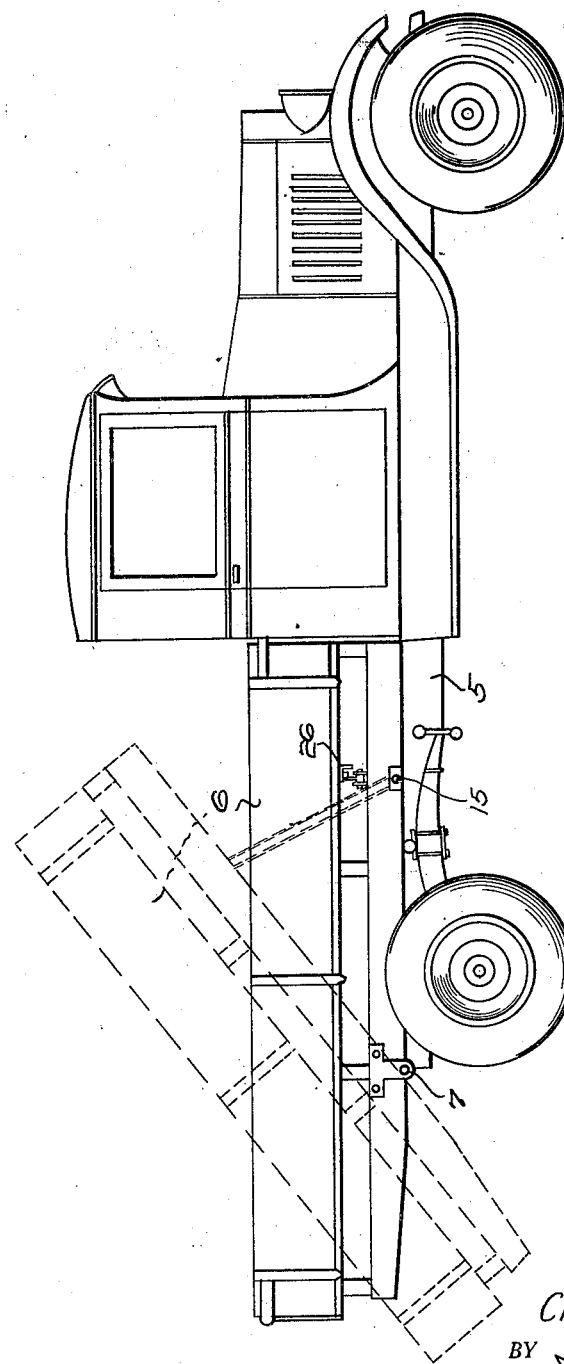
Fig. 1 is a side elevation of a portion of a truck having the apparatus of the present invention applied thereto.

In the drawings, 5 designates the chassis of a truck, and 6 the dumping body that is pivoted to the chassis, at 7. The hoisting mechanism is disposed transversely of and rests upon the chassis and comprises a channel-like member 8, that is secured to the chassis by angle irons 9. Nuts 10 and 11 are mounted upon a screw 12, having the reversely threaded portions 13 and 14 arranged to cause the nuts 10 and 11 to move toward or from each other, as the case may be, when turning movement is imparted to the screw, through its end extensions 15, to which a crank (not shown) may be applied. Levers 16 and 17, arranged in pairs, are pivoted to the opposite sides of the nuts 10 and 11, as indicated at 18 and 19. These levers are also traversed at their point of crossing, by a pivot 20. At their outer ends, the levers are pivoted to lift links 21 and 22, the upper ends of said links being, in turn, pivotally connected at 23 and 24, upon a block 25, which is, in turn, carried by the body lift angle-iron 26, which is secured to the underside of the body 6. When the truck body is in its lowered position, the hub-like portions 27, of the links 21 and 22, which lie between the outer ends of the levers 16 and 17, rest upon the outer ends of a leaf spring 28, said spring being, in turn, supported by a bracket of inverted U-shape 29, which straddles the channel 8, at its central portion. This cushions the truck body, takes a great deal of the strain off of the lifting mechanism, and reduces noise and rattle. The arrangement is such as to produce a quick and relatively high lift, with a minimum of effort upon the part of the operator. I contemplate employing a guard over the screw 13—14. However, this guard has been omitted to preserve the clearness of the drawing, since its inclusion is a mere matter of choice and mechanical skill.

It is to be understood that the invention is not limited to the precise construction set forth, but that it includes within its purview whatever changes fairly come within either the terms or the spirit of the appended claims.

Having described my invention, what I claim is:

1. The combination with a vehicle comprising a chassis having a body pivotally mounted thereon, a U-shaped channel extending across the chassis and secured thereto, a screw having its ends shaped for engagement by its crank, supported within said channel, said screw comprising reversely threaded portions upon opposite sides of its center, nuts upon said threaded portion, crossed levers having their lower ends pivotally connected to said nuts and being pivotally connected to each other at their point of crossing, said levers being arranged in pairs and spaced from each other, links comprising hub-like portions lying between the upper ends of said levers, pivots passing through said portions and through the upper ends of the levers, means for pivotally connecting the upper ends of said links to the truck body, and a leaf spring supported on the frame longitudinally of the screw and the ends of which are disposed in the path of downward movement of the hub portions of the links.

2. The combination with a vehicle comprising a chassis having a body pivotally mounted thereon, a U-shaped channel extending across the chassis and secured thereto, a screw having its ends shaped for engagement by its crank, supported within said channel, said screw comprising reversely threaded portions upon opposite sides of its center, nuts upon said threaded portion, crossed levers having their lower ends pivotally connected to said nuts and being pivotally connected to each other at their point of crossing, said levers being arranged in pairs and spaced from each other, links comprising hub-like portions lying between the upper ends of said levers, pivots passing through said portions and through the upper ends of the levers, means for pivotally connecting the upper ends of said links to the truck body, a leaf spring supported on the frame longitudinally of the screw and the ends of which are disposed in the path of downward movement of the hub portions of the links, and a member of inverted U-shape bridging the channel at its central portion and to which the central portion of said spring is secured.

3. A wheeled motor truck comprising an elongated chassis, extending longitudinally of the truck, an elongated truck body lying longitudinally of the truck above the chassis and transversely pivoted upon the chassis at a point toward its rear end and a lifting mechanism acting between the chassis and the body at a point toward the front end of the body comprising a pair of crossed levers, a reversely threaded screw, nuts upon said screw with which the lower ends of said levers are pivotally connected, said levers being pivotally connected at their points of crossing, lifting links with which the outer ends of said levers are pivotally engaged, means for pivotally connecting the upper ends of the lift link to the truck body and means supported from the sides of the chassis constituting a mounting for the screw, in which said screw is journalled to turn; in combination with a spring supported from the chassis and arranged to receive and support the pivotal connections between the levers and the links when the body is in lowered position.

4. A wheeled motor truck comprising an elongated chassis, extending longitudinally of the truck, an elongated truck body lying longitudinally of the truck above the chassis and transversely pivoted upon the chassis at a point toward its rear end and a lifting mechanism acting between the chassis and the body at a point toward the front end of the body comprising a pair of crossed levers, a reversely threaded screw, nuts upon said screw with which the lower ends of said levers are pivotally connected at their points of crossing, lifting links with which the outer ends of said levers are pivotally engaged, means for pivotally connecting the upper ends of the lift link to the truck body and means supported from the sides of the chassis constituting a mounting for the screw, in which said screw is journalled to turn; which mounting for the screw includes a channel which extends transversely across the chassis and within which said screw lies, and spring means supported from said channel in position to receive and support the pivotal connections between the levers and the links, when the body is in lowered position.

In testimony whereof I affix my signature.

CHARLES H. MILLER.